J. OTTO.
BEARING STRUCTURE FOR MACHINES OPERATING IN WATER.
APPLICATION FILED FEB. 9, 1909.

1,000,935.

Patented Aug. 15, 1911.

Witnesses:
George W. Tilden
J. Ellis Elim

Inventor:
Johann Otto,
by Albert G. Davis
Att'y.

UNITED STATES PATENT OFFICE.

JOHANN OTTO, OF RIGA, RUSSIA, ASSIGNOR TO GENERAL ELECTRIC COMPANY, A CORPORATION OF NEW YORK.

BEARING STRUCTURE FOR MACHINES OPERATING IN WATER.

1,000,935.  Specification of Letters Patent.  Patented Aug. 15, 1911.

Application filed February 9, 1909. Serial No. 476,912.

*To all whom it may concern:*

Be it known that I, JOHANN OTTO, a subject of the Emperor of Austria-Hungary, residing at Riga, Russia, have invented certain new and useful Improvements in Bearing Structures for Machines Operating in Water, of which the following is a specification.

My invention relates to a means for preventing water from entering the casing of machines operating in or under water, and is particularly applicable to dynamo-electric machines of the direct-current type. If water enters the casings of such machines it causes a great amount of trouble, and it is the object of my invention to prevent such an entrance of water.

To this end, my invention consists in the combination of an inclosed casing of a machine designed for operation in water having a shaft extending beyond the casing, a bearing for said shaft, and a deflector on said shaft situated in the bearing chamber, said bearing having a lubricating chamber filled with lubricating material of less specific gravity than water, an overflow for the water that enters said lubricating chamber, a second chamber into which the water enters from said overflow, and means for removing said water.

Other features of novelty which characterize my invention are pointed out with particularity in the claims annexed to and forming a part of this specification. For a better understanding of my invention, however, and the advantages possessed by it, reference may be had to the following description taken in connection with the accompanying drawing, in which—

Figure 1:
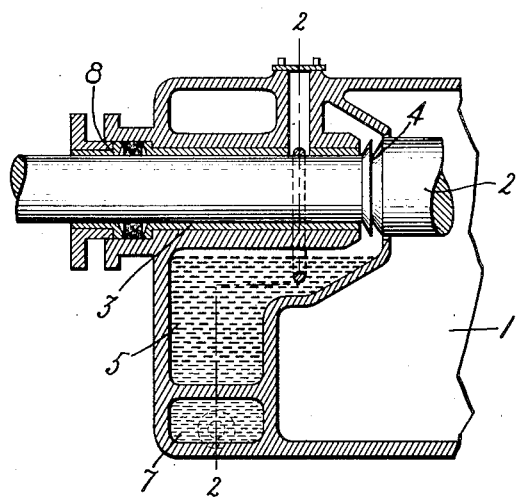
Figure 2:
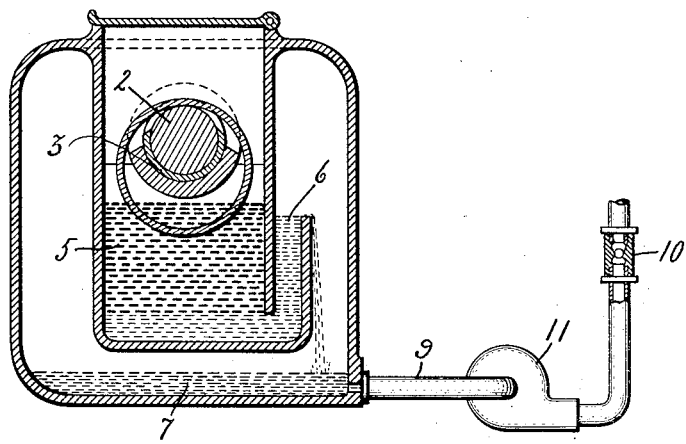

Figure 1 is a section through a bearing and a portion of a totally inclosed casing of a machine embodying my invention, and Fig. 2 is a section on the line 2—2 of Fig. 1.

1 is the inclosed casing of a machine into which it is desired to prevent water from entering when the machine is operating in or under water, and is shown as being broken away. The shaft 2 of the machine has its operating end extending beyond the casing, rotates in a bearing 3, and is provided with a deflector 4 situated in the bearing chamber. The bearing has a lubricating chamber 5 filled with a lubricant of less specific gravity than water, and an overflow 6 for the water that enters the lubricating chamber. The overflow of water is collected in a second chamber 7 formed in the bearing, from which it may be removed by suitable means. The outer end of the bearing may be provided with a stuffing box 8. The lubricating chamber 5 and the chamber 7 are formed in the bearing housing. A discharge pipe 9 is connected to the chamber 7 and is provided with a check valve 10 to prevent water reëntering the chamber 7 through the pipe 9. A pump 11 may be provided in the pipe 9. This pump is suitably driven, and may be used to force the water out of this second chamber. Even when the outer end of the shaft is provided with a stuffing box 8, water will find its way into the bearing to the deflector 4, whence it is thrown by the rotation of the shaft 2 into the lubricating material contained in the lubricating chamber 5. The water being specifically heavier than the lubricating material, it sinks to the bottom of the chamber and the lubricating material floats on top of the water. As the water enters, the lubricating material in the overflow 6 flows into the chamber 7. The lubricating material in the upper portion of the chamber 5 cannot enter the overflow, however, so that only the small column of lubricating material in the overflow is lost. As water continues to enter the bearing it overflows into the chamber 7, from which it is drawn by the pump 11 and forced out through the check valve 10. The water in the chamber 7 may be removed by means of air pressure, in which case the pump 11 may be dispensed with.

The means above described are not only adapted to prevent the entrance of water into the casing of a machine, but any fluid which has a specific gravity greater than the lubricating material. I, therefore, desire it to be understood that my invention is not limited to the particular construction shown and described, and I aim in the appended claims to cover all modifications which do not depart from the spirit and scope of my invention.

What I claim as new, and desire to secure by Letters Patent of the United States, is,—

1. In combination, an inclosed casing of a machine designed for operation in a fluid, a shaft extending beyond the casing, a bearing for said shaft, a deflector on said shaft situated in the bearing chamber, said bearing having a lubricating chamber filled with lubricant of less specific gravity than said fluid, an overflow for the fluid that enters said lubricating chamber, and a second chamber into which the fluid enters from said overflow, and means for removing said fluid.

2. In combination, an inclosed casing of a machine designed for operation in a fluid, a shaft extending beyond the casing, a bearing for said shaft, a deflector on said shaft situated in the bearing chamber, said bearing having a lubricating chamber filled with lubricant of less specific gravity than said fluid, an overflow for the fluid that enters said lubricating chamber, and a second chamber into which the fluid enters from said overflow, and means for removing said fluid comprising a pump and a check valve.

3. In combination, an inclosed casing of a machine designed for operation in a fluid, a shaft extending beyond the casing, a bearing for said shaft, a deflector on said shaft situated in the bearing chamber, said bearing having a lubricating chamber filled with lubricant of less specific gravity than said fluid, an overflow for the fluid that enters said lubricating chamber, and a second chamber into which the fluid enters from said overflow, a pipe leading from said second chamber, a check valve in said pipe, and means for forcing said fluid out of said second chamber.

4. In combination, an inclosed casing of a machine designed for operation in a fluid, a shaft extending beyond the casing, a bearing for said shaft, a stuffing box around said shaft to prevent said fluid entering said bearing, a deflector on said shaft situated in the bearing chamber for throwing the fluid from said shaft which has entered said bearing through said stuffing box, and a bearing housing having a lubricating chamber formed therein and filled with lubricating material of less specific gravity than said fluid, and an overflow for the fluid that enters said lubricating chamber.

5. In combination, an inclosed casing of a machine designed for operation in a fluid, a shaft extending beyond the casing, a bearing for said shaft, a deflector on said shaft situated in the bearing chamber for throwing the fluid from said shaft which has entered said bearing, a bearing housing having a lubricating chamber formed therein and containing lubricating material of less specific gravity than said fluid, an overflow for the fluid that enters said lubricating chamber and a second chamber into which the fluid enters from said overflow, and means for removing said fluid.

6. In combination, an inclosed casing of a machine designed for operation in a fluid, a shaft extending beyond the casing, a bearing for said shaft, a deflector on said shaft situated in the bearing chamber for throwing the fluid from said shaft which has entered said bearing, a bearing housing having a lubricating chamber formed therein and containing lubricating material of less specific gravity than said fluid, an overflow for the fluid that enters said lubricating chamber and a second chamber into which the fluid enters from said overflow, a pipe leading from said second chamber, a check valve in said pipe, and means for forcing said fluid out of said second chamber.

In witness whereof, I have hereunto set my hand this 21st day of January, 1909.

JOHANN OTTO.

Witnesses:
 HERNANDO DE SOTO,
 T. REPASS.